R. SCHMITZ.
VALVE FOR HYDROCARBON ENGINES.
APPLICATION FILED JULY 12, 1915.
1,312,003.
Patented Aug. 5, 1919.
2 SHEETS—SHEET 2.
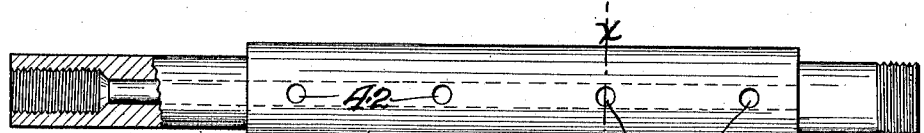
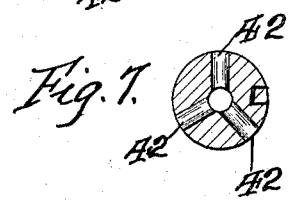
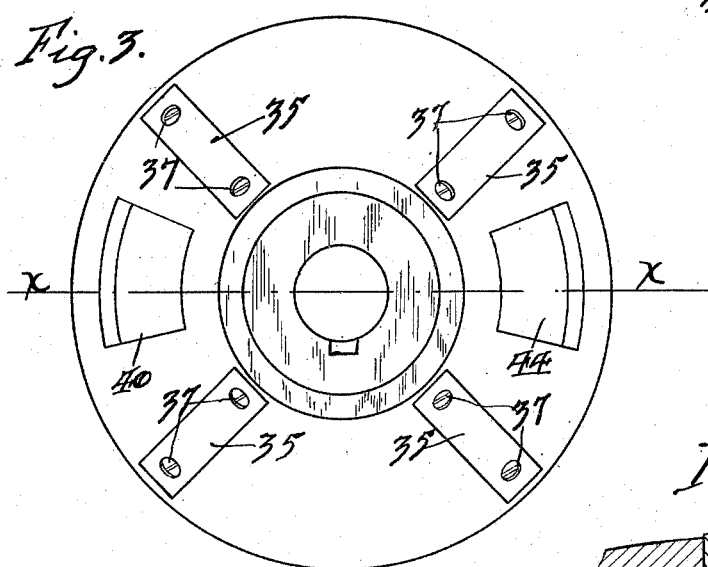
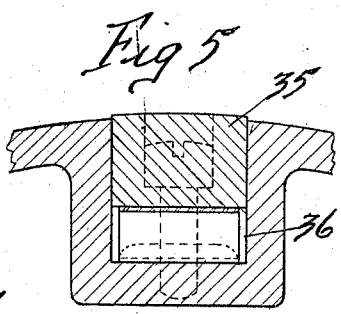
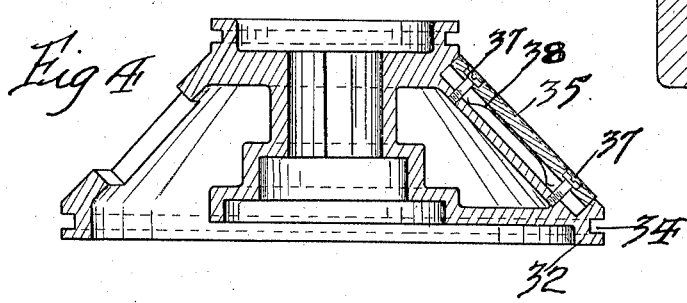

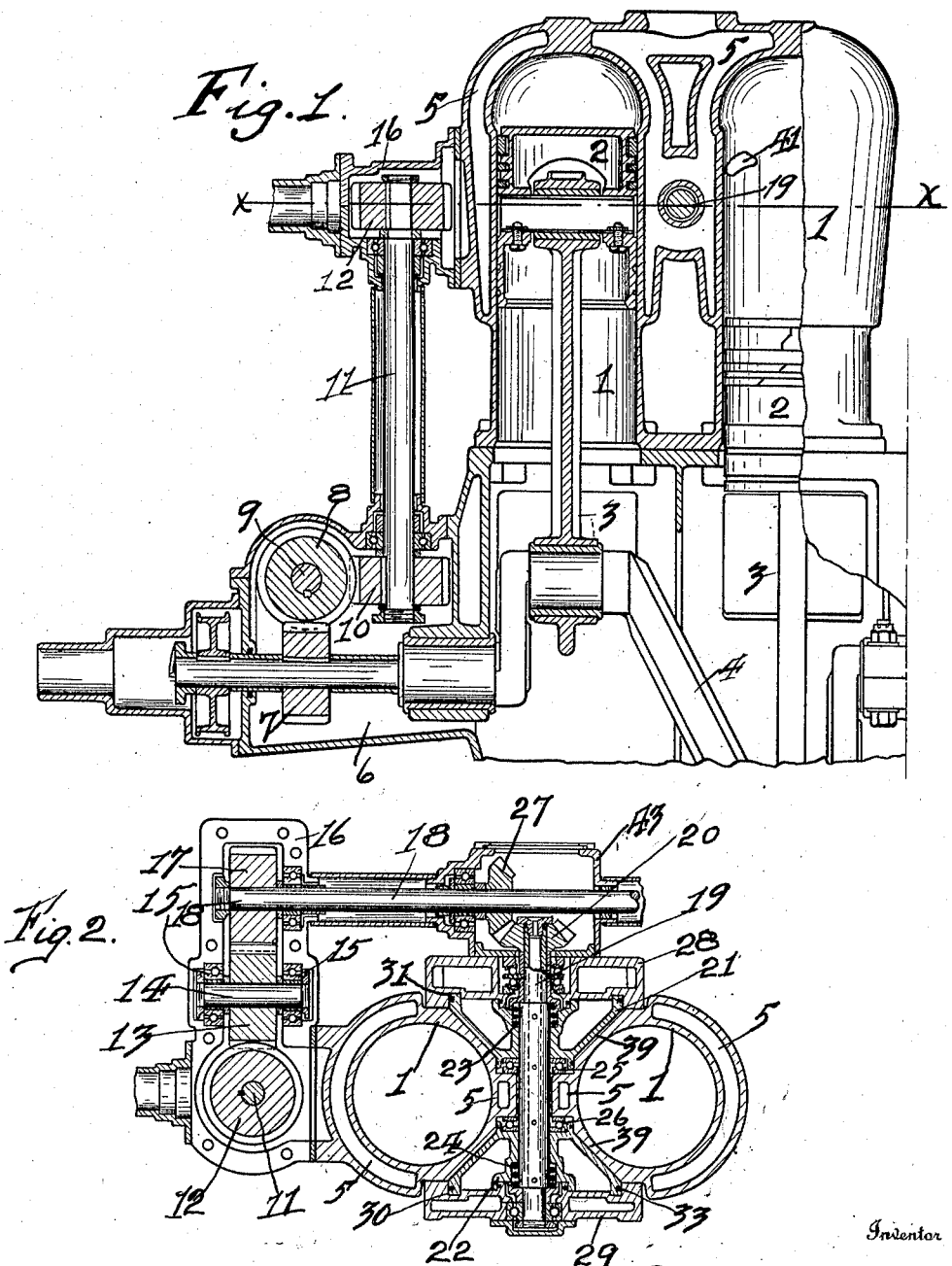

UNITED STATES PATENT OFFICE.

RICHARD SCHMITZ, OF CHICAGO, ILLINOIS, ASSIGNOR TO SCHMITZ ENGINE COMPANY, A CORPORATION OF SOUTH DAKOTA.

VALVE FOR HYDROCARBON-ENGINES.

1,312,003.               Specification of Letters Patent.       Patented Aug. 5, 1919.

Application filed July 12, 1915. Serial No. 39,221.

*To all whom it may concern:*

Be it known that I, RICHARD SCHMITZ, a citizen of the United States, residing at Chicago, in the county of Cook and State of Illinois, have invented a certain new and useful Improvement in Valves for Hydrocarbon-Engines, of which the following is a specification.

My invention relates to that class of valves which are described in my co-pending application, Serial No. 784,489, filed August 13, 1913, and has for its object to provide an improved means for sealing the valve to prevent leakage, and has for its further object the provision of means for lubricating the valve and valve bearings.

My means of accomplishing the foregoing objects may be more readily understood by having reference to the accompanying drawings, which are hereunto annexed and are a part of this specification, in which:

Figure 1 is a vertical sectional view of a part of a hydro-carbon engine equipped with my improved valve, a portion of one of the cylinders being shown in section.

Fig. 2 a cross-section taken on the line $x$—$x$ in Fig. 1, the piston being omitted for the sake of clearness.

Fig. 3 is a top or plan view of one of my improved valves.

Fig. 4 is a cross-section taken on the line $x$—$x$ in Fig. 3.

Fig. 5 is an enlarged fragmentary detail view in cross-section of one of the sealing plates.

Fig. 6 is an enlarged detail view of the oil feed.

Fig. 7 is a cross-section taken on the line $x$—$x$ in Fig. 6.

Similar reference numerals refer to similar parts throughout the entire description.

As shown in Fig. 1, the engine is provided with cylinders 1, which are provided with pistons 2, connected by connecting rods 3, to a crank 4, in the usual manner. The cylinders are provided with waterjackets 5, for the purpose of cooling the same, and the crank case 6, only a fragmentary portion of which is shown. Mounted upon the outer end of the crank shaft 4, is a spiral gear 7, which meshes with a spiral gear 8, mounted upon a shaft 9, which is at right angles to the crank shaft 4. This gear in turn meshes with a spiral gear 10, which is fixedly secured to a vertical shaft 11, which carries a spiral gear 12 at its upper end. This gear meshes with an intermediate gear 13, mounted upon a shaft 14, journaled in suitable bearings 15, carried by the gear case 16. The intermediate gear is in mesh with the gear 17, mounted upon one end of the shaft 18, which extends along the side of the cylinders of the engine, and has mounted thereon at intervals beveled gears 27, one of which only is shown. These gears are designed for the double purpose of driving the valve shaft 19, which it does through the beveled gear 20, and acting as a pump to force the oil through the valve shaft 19, the operation of which will be hereinafter explained.

My improved valves 21 and 22, are splined upon the valve shaft 19, so as to be freely movable longitudinally on said shaft, but not rotatively. Coil springs 23 and 24, are provided for holding the valves in place, ball thrust bearings 25 and 26, being provided to care for pressure exerted by the springs. The valves, as shown, are the same shape as are the valves in my co-pending application hereinbefore referred to. They are mounted on opposite sides of the cylinders intermediate adjacent cylinders, one valve taking care of the exhaust from both cylinders, the other taking care of the intake for both cylinders.

Valve caps 28 and 29, are provided to hold the valves in position. Each one is provided with an annular groove 30 and 31, on their inner faces, which is adapted to receive a peripheral flange 32, formed on the inner side of the valve; the piston ring 33, mounted in the circumferential groove 34, serves to keep this portion of the valve tight. The valves are similar in shape to those shown in my co-pending application hereinbefore referred to, but I have provided an improved means for sealing them and making them tight, which may be more clearly seen and understood by having reference to Figs. 3, 4, and 5. These means consist of sealing plates 35. As shown, there are four of them which are recessed into the face of the valve fitting into recesses 36, which are cast or formed in the valve. These sealing plates are held in position by fillister head screws 37, or by any other suitable or convenient means for holding them in place.

A flat bow spring 38, is provided to hold them out against the valve seat 39, on the side walls of the cylinder; although I have shown and described a bow spring for this purpose it is apparent that any desirable means for this purpose may be employed.

The result of this construction is that the sealing plates 35, act precisely as piston rings would do, while the pressure on the valve through the ports leading into the cylinder is resisted by the coil springs 24 and 25. The valves are kept tight by means of the sealing plates 35. Ports 40 and 44, are provided in the valves for the inlet or exhaust of the gases. As shown, the valves are timed 1 to 4, so that when the speed of the crank shaft is 1000 R. P. M., the valve will only be turning 250. This timing enables me to keep the exhaust valve open for a longer period of time, thereby not only assisting the operation of the piston in scavenging the cylinder, but it permits the fresh gas to enter through the inlet ports 41, (one only being shown) which assists in the operation of driving out the products of combustion.

My improved means of oiling the valves is as follows:

The gears 18 and 20, are mounted and rotate in a casing 43, which is filled with lubricating oil from any suitable source of supply (not shown). The valve shaft 20, is hollow, and is provided with openings 42, which are placed 120° apart and are located upon the shaft adjacent the front and rear of the valves. The result of this is that when the gears are operated they act so as to cause a circulation of the oil through the shaft which in turn throws it out through the openings 42, so that the valves and the thrust bearings 25 and 26, are thoroughly lubricated at all times, this being a positive feed, a dry valve or bearing in the case of accident or some unusual condition is impossible.

It will be apparent from the foregoing description that I have greatly reduced the wearing parts of the valves and decreased the frictional losses by my improved sealing plate 35. Although I have described and shown my sealing plates in connection with conical valves, it will be apparent that they can also be used with a flat rotary valve.

Having described my invention what I regard as new and desire to secure by Letters Patent is:

1. The combination with a gas engine of a pair of rotary valves, a shaft mounted intermediate adjacent cylinders to drive said valves, the seats for said valves being formed on the side walls of the cylinders, there being ports in said valves and ports in the cylinders of the engine with which the ports of the valves register during rotation, means actuated by the crank shaft to rotate said valves, a plurality of sealing plates mounted in said valves intermediate said ports, and means to hold said plates yieldingly against the face of the valve seat.

2. The combination with a gas engine of a pair of rotary valves, a shaft mounted intermediate adjacent cylinders to drive said valves, the seats for said valves being formed on the side walls of the cylinders, there being ports in said valves and ports in the cylinders of the engine with which the ports of the valves register during rotation, means actuated by the crank shaft to rotate said valves, a plurality of sealing plates mounted in said valves intermediate said ports, and means to hold said plates yieldingly against the face of the valve-seat, said valves being splined upon the valve-shaft, springs to hold said valves against the valve-seat, and ball thrust bearings to take up the pressure of said springs.

3. A gas engine having rotary valves of truncated cone-shape mounted intermediate adjacent cylinders, the seats for said valves being formed on the side walls of the cylinders, there being ports in the tapering walls of said valves, and corresponding ports in the cylinders of the engine, means actuated by the crank shaft to rotate said valves, sealing plates mounted in the tapering walls of the said valves intermediate the ports, means to hold said plates yieldingly against the face of the valve-seat, springs to hold said valves against the valve-seat, ball thrust bearings to take up the pressure of said springs, said valves being mounted on a hollow valve shaft, there being radial openings in said valve-shaft adjacent the front and rear of each of the valves, and means to cause the driving of said valves to force a lubricant through said shaft and out of said openings.

In testimony whereof, I have signed the foregoing specification.

RICHARD SCHMITZ.